(12) United States Patent
Hrehor et al.

(10) Patent No.: US 11,513,612 B1
(45) Date of Patent: Nov. 29, 2022

(54) HYBRID MULTIPLE SENSOR KEYBOARD

(71) Applicant: Dell Products L.P., Round Rock, TX (US)

(72) Inventors: Robert D. Hrehor, Round Rock, TX (US); Jace W. Files, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/325,512

(22) Filed: May 20, 2021

(51) Int. Cl.
  *G06F 3/02* (2006.01)
  *G06F 3/044* (2006.01)
  *G06F 3/01* (2006.01)

(52) U.S. Cl.
  CPC ............ *G06F 3/0202* (2013.01); *G06F 3/016* (2013.01); *G06F 3/044* (2013.01); *G06F 2203/04105* (2013.01)

(58) Field of Classification Search
  None
  See application file for complete search history.

(56) References Cited

U.S. PATENT DOCUMENTS

| | | | |
|---|---|---|---|
| 9,159,509 B2 | 10/2015 | Kudma et al. | |
| 9,298,275 B2 | 3/2016 | Mortel | |
| 9,490,087 B2 | 11/2016 | Krumpelman et al. | |
| 2012/0092263 A1 | 4/2012 | Peterson et al. | |
| 2013/0120265 A1 | 5/2013 | Horii et al. | |
| 2018/0348889 A1* | 12/2018 | Nishimura | G06F 3/044 |
| 2020/0387245 A1* | 12/2020 | Chen | G06F 3/0202 |

* cited by examiner

*Primary Examiner* — Stephen T. Reed
(74) *Attorney, Agent, or Firm* — Zagorin Cave LLP; Robert W. Holland

(57) ABSTRACT

An information handling system keyboard includes moveable keys that depress vertically to perform an input at a membrane, such as against a contact sensor, and fixed keys that detect an input without requiring vertical movement, such as a force against a pressure sensor integrated in the membrane. The fixed keys are disposed at opposing sides of the keyboard to align along an edge of the information handling system housing and the moveable keys are disposed between the opposing ends of fixed keys. Haptic actuators disposed under the fixed keys provides feedback to an end user when an input is sensed at a fixed key.

19 Claims, 4 Drawing Sheets

HYBRID MULTIPLE SENSOR KEYBOARD

BACKGROUND OF THE INVENTION

Field of the Invention

The present invention relates in general to the field of portable information handling system input devices, and more particularly to an information handling system hybrid multiple sensor keyboard.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell position, the lid housing portion rotates approximately ninety degrees to a raised position above the main housing portion so that an end user can type inputs at the keyboard while viewing the display. After usage, convertible information handling systems rotate the lid housing portion over the main housing portion to protect the keyboard and display, thus reducing the system footprint for improved storage and mobility.

Generally, end users prefer that portable information handling systems have a minimal size and weight to improve portability. An end user typically selects a system based upon the size of the integrated display, which generally fills the length and width of the lid housing portion, and then performs a tradeoff between system performance and housing thickness, also known as Z-height. A thicker housing offers a larger internal space in which to place processing components, such as central processing unit (CPU) and memory, to accommodate larger components and improved thermal management, such as a larger heat sink and cooling fan. One way to reduce Z-height is to reduce the size of the keyboard, such as by reducing key vertical travel. Some information handling systems use integrated keyboards that have keys with no movement, such as a display that presents a virtual keyboard having key inputs detected by touch, such as with a capacitive touch sensor. Other systems reduce the vertical movement of the keys so that the keyboard consumes less Z-height. A difficulty with this approach is that end users tend to prefer physical feedback of a key press when using a keyboard so that too short of a vertical key movement can result in a poor end user experience.

Another difficulty that can arise with systems having a reduced footprint in length and width is that the keyboard shrinks to a size that cramps an end user's fingers when typing inputs. Generally, the keyboard width is restricted at the sides of the housing so that a border is placed between the end of the keyboard and the housing edge. The border provides room to include ports along the housing edge, such as USB and display ports. In addition, the border improves the appearance of the system when in a closed position by hiding the keys from view.

SUMMARY OF THE INVENTION

Therefore, a need has arisen for a system and method which provides a hybrid multiple sensor keyboard.

In accordance with the present invention, a system and method are provided which substantially reduce the disadvantages and problems associated with previous methods and systems for integrating a keyboard in an information handling system housing. A keyboard includes a first set of keys that detect inputs when depressed by an end user towards an underlying membrane and a second set of keys that detect inputs when a force is applied to a key and without regard to movement of the key.

More specifically, a portable information handling system processes information with processing components disposed in a housing. A keyboard integrated in the housing accepts end user typed inputs at moveable keys having inputs sensed by a contact sensor and fixed keys having inputs sensed by a pressure sensor. A haptic actuator disposed below each fixed key provides haptic feedback when an input is detected by pressure sensor. A membrane disposed under both the fixed keys and moveable keys integrates the contact sensors and pressure sensors in a contiguous flexible printed circuit and includes or interfaces with a pressure controller to manage pressure sensor inputs and a contact controller to manage contact sensor inputs. In one embodiment, the keyboard disposes fixed keys at opposing ends and moveable keys between the fixed keys so that the keyboard consumes less vertical Z-height at the opposing ends. The reduced keyboard Z-height provides additional space along the perimeter of the information handling system housing to incorporate components, such as communication ports, and allows the keyboard to extend across the entire width of the housing.

The present invention provides a number of important technical advantages. One example of an important technical advantage is that a keyboard detects inputs with both fixed and moveable keys. By integrating the keyboard into a portable information handling system so that fixed keys are located where components need greater Z-height, additional vertical room is provided under the fixed keys, such as to accommodate ports disposed along a side surface of the information handling system housing. By minimizing the vertical space needed for the keyboard along the edge of the information handling system housing, the keyboard may be extended from edge to edge across the housing width so that a larger keyboard with improved key spacing is available and provides the end user with an improved input experience. Where opposing sides of a keyboard have fixed keys and a central region of the keyboard has moveable keys, an end user has movement as a primary feedback for keys that are most commonly used and haptic actuation as feedback for keys that are less commonly used so that the end user's typing interactions provide optimal typed inputs while the keyboard consumes minimal vertical Z-height in critical regions. Further, fixed keys at the information handling system housing perimeter provide improved aesthetics with the housing in a closed position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A hybrid multiple sensor keyboard integrates at a portable information handling system housing edge to provide improved aesthetics in a low Z-height system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
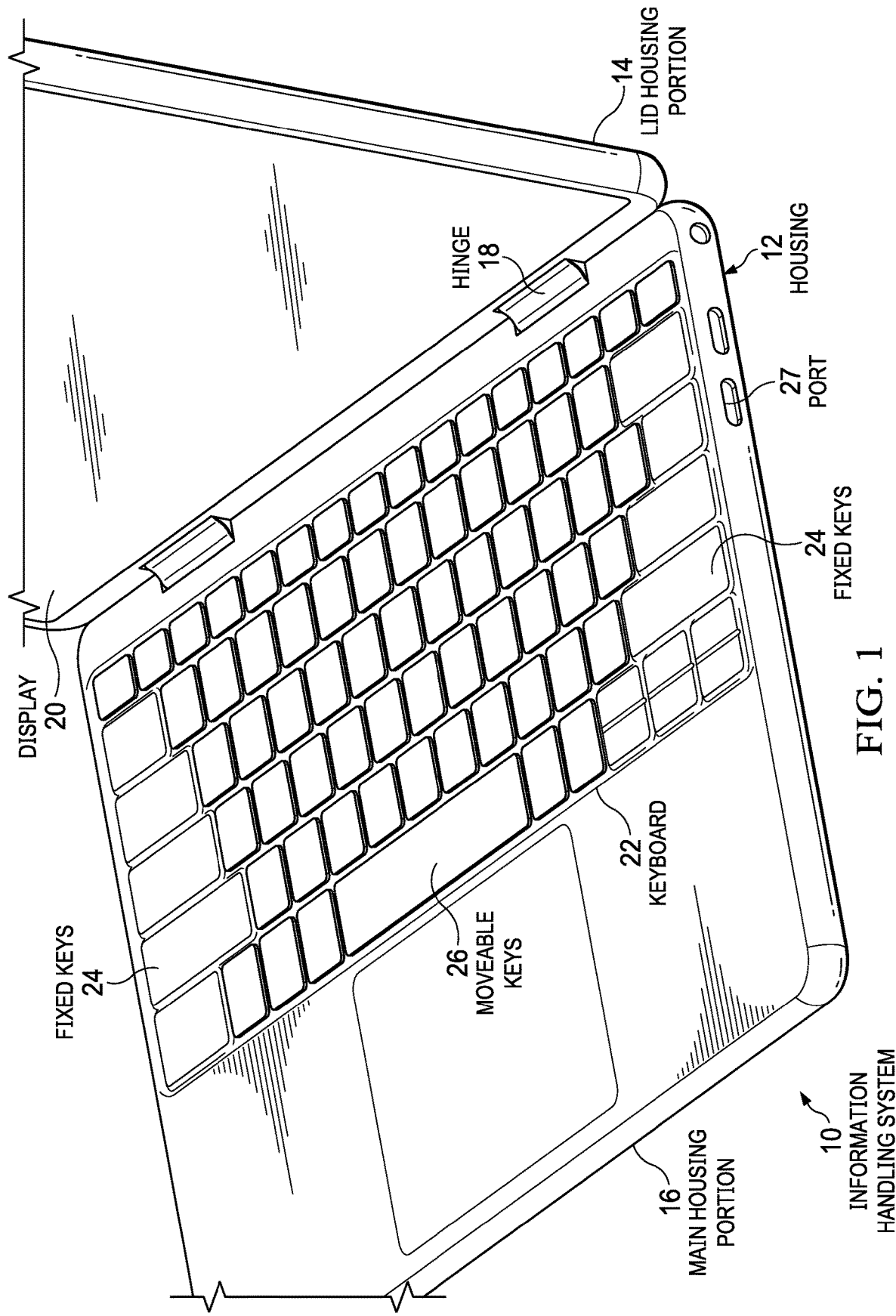
FIG. 1 depicts a side perspective view of a portable information handling system having a hybrid multi-sensor keyboard.

Referring now to FIG. 1, a side perspective view depicts a portable information handling system 10 having a hybrid multi-sensor keyboard 22. In the example embodiment, information handling system 10 has a portable housing 12 built with a lid housing portion 14 rotationally coupled to a main housing portion 16 by a hinge 18. Housing 12 rotates the housing portions about hinge 18 between the clamshell configuration that is depicted and a closed position in which lid housing portion 14 rotates down and against main housing portion 16 so that display 20 integrated in lid housing portion 14 has a planar proximate position over keyboard 22. Information handling system 10 integrates processing components in main housing portion 16 that cooperate to process information and present the information as visual images at display 20, such as by executing instructions of an operating system and applications. The convertible configuration of portable information handling system 10 provides a convenient system for mobile use. For instance, in the depicted clamshell position, main housing portion 16 rests on a support surface and holds lid housing portion 14 in a viewing position so that an end user can type inputs through keyboard 22 while view information presented at display 20.

In the example embodiment, main housing portion 16 has a reduced Z-height provided in part by a low profile hybrid multi-sensor keyboard 22. A partial set of the keys of keyboard 22 detects inputs with moveable keys 26 that use a contact sensor while a second partial set of keys of keyboard 22 detects inputs with fixed keys 24. Fixed keys 24 are disposed at opposing sides of keyboard 22 and align with an outer perimeter of main housing portion 16. Moveable keys 26 are disposed between the opposing ends of keyboard 22 and the fixed keys 24. As is described in greater detail below, moveable keys 26 depress in response to a press to travel vertically down and press against a first sensor of a membrane disposed below keyboard 22 that detects the input. For example, moveable keys 26 may press against a contact sensor or other type of sensor that detects movement to proximity of the membrane, such as magnetic sensor, light sensors or any other conventional type of contact sensor. Downward travel of moveable keys 26 and an upward biasing force that returns moveable keys 26 to a raised position provides an end user with feedback of inputs made, which generally tends to help end users when typing. The central location of keyboard 22 that includes the moveable keys 26 are generally letters and numbers that are most commonly used during typing where feedback is most helpful for an end user. In contrast, fixed keys 24 have a fixed position that does not require vertical travel to record an input, although some compression may occur when an end user presses a fixed key 24 against an underlying membrane. For example, fixed keys 24 detect an input based upon a touch force applied by the end user, such as with a pressure sensor or capacitive sensor. The opposing ends of keyboard 22 where fixed keys 24 are disposed generally has inputs that are less commonly used during typing inputs and less important for rapid end user inputs, such as shift, capital lock, tab and enter. Fixed keys 24 provide feedback to the end user that an input is made by activation of a haptic actuator, such as a piezoelectric device or off balance rotating device.

In the example embodiment, fixed keys 24 do not have a demarcation between keys that is visible at the side of main housing 16. As a result, when lid housing portion 16 closes over main housing portion 14, keyboard 22 is hidden from view to offer improved system aesthetics. Using fixed keys 24 in this manner allows the full width of main housing portion 16 to be used for keyboard 22 so that a larger keyboard may be integrated in information handling system 10 with more comfortable key spacing and size for end user interactions. In addition, because keyboard 22 uses less Z-height for fixed keys 24 that do not require vertical movement for inputs, space is available along the side of main housing portion 16 to include ports 27 that accept peripheral cables, such as USB and display cables. Overall Z-height of main housing portion 16 is reduced in this manner.

Figure 2:
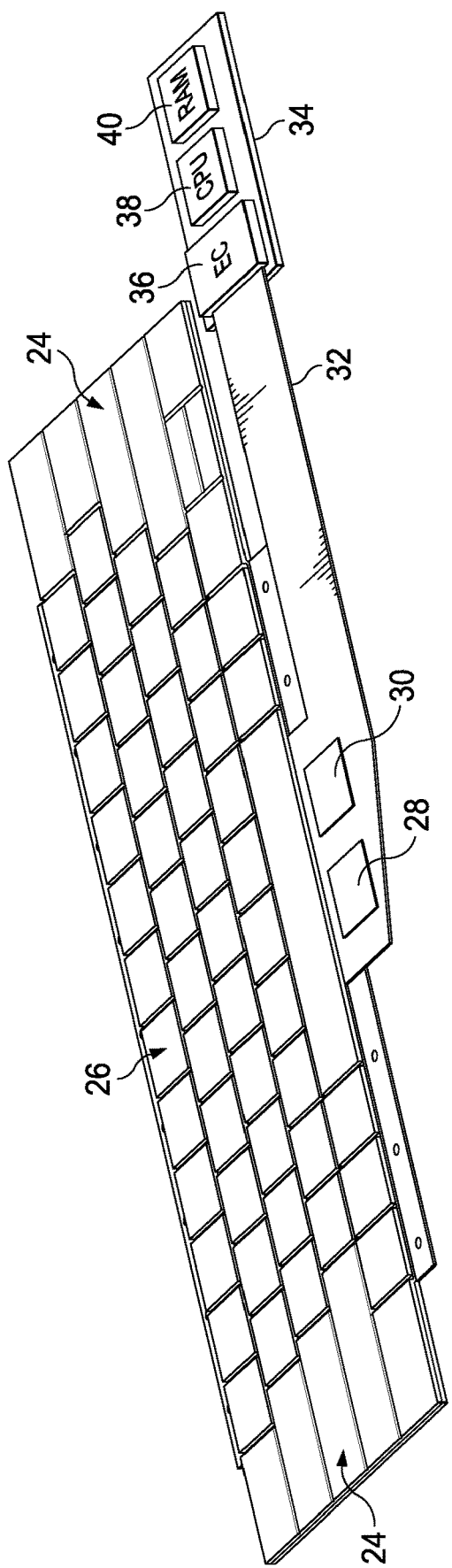
FIG. 2 depicts an upper perspective view of the hybrid multi-sensor keyboard.

Referring now to FIG. 2, an upper perspective view depicts the hybrid multi-sensor keyboard 22. In the example embodiment, only fixed keys 24 are disposed at opposing ends of keyboard 22 while a central region of keyboard 22 has only moveable keys 26. In alternative embodiments, fixed keys 24 may be strategically placed where Z-height restrictions of the housing make moveable keys 26 undesirable. The example embodiment has a pressure sensor controller 28 that provides power to pressure sensors associated with fixed keys 24 and a contact switch controller 30 that detects inputs made at a contact sensor. An interface cable 32 provides communication of detected inputs from keyboard 22 to a motherboard 34 of the information handling system. For example, an embedded controller 36 on motherboard 34 receives the inputs and communicates the inputs to a central processing unit (CPU) 38, which processes information by executing instructions in cooperation with a random access memory (RAM) 40 that stores the instructions and information. Haptic feedback by haptic actuators associated with each of fixed keys 24 may be commanded directly by pressure sensor controller 28 and inputs are detected or by embedded controller 36 as inputs are reported through interface cable 32. In the example embodiment, moveable keys 26 in the raised position align in a common plane with fixed keys 24. Moveable keys 26 depress below the raised plane to make an input. Fixed keys 24 remain in the common plane during inputs where inputs are determined by force at a fixed key without requiring movement.

Figure 3:
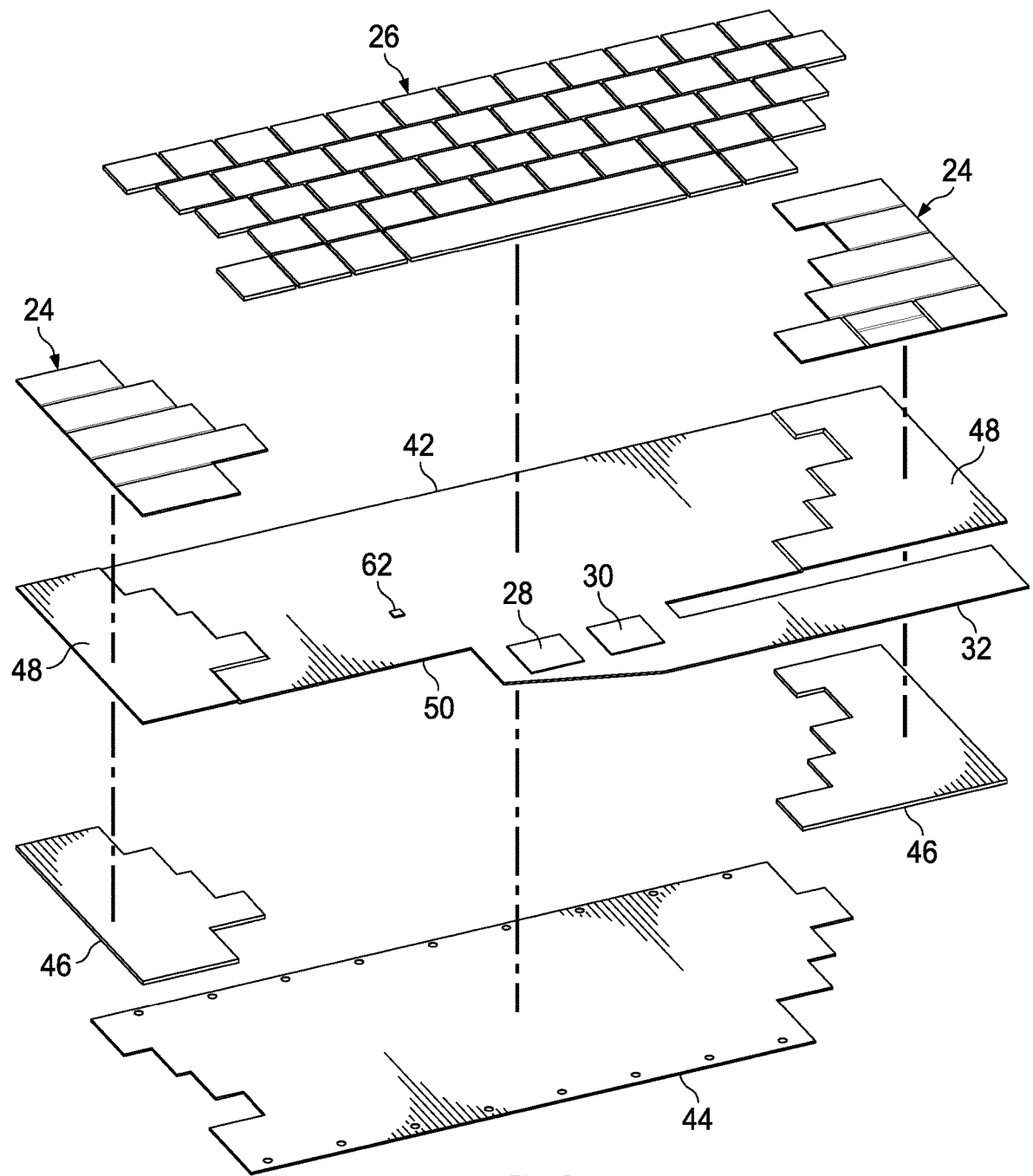
FIG. 3 depicts an exploded perspective view of the hybrid multi-sensor keyboard.

Referring now to FIG. 3, an exploded perspective view depicts hybrid multi-sensor keyboard 22. In the example embodiment, a single membrane 42 integrates both contact sensors and pressure sensors to support both fixed and moveable key inputs. A support plate 44 is disposed below membrane 42 to provide resistance against end user presses so that force and contacts are properly sensed. Membrane 42 is composed of a contiguous sheet of embossed or formed polyethylene terephthalate (PET) film or other flexible printed circuit board and integrates wirelines to communicate inputs to interface cable 32. Raised portions 48 of membrane 42 align under fixed keys 24 to support input detection at their raised position. A lower portion 50 of membrane 42 aligns under moveable keys 26 to provide vertical room for depression of moveable keys 26 to press down against membrane 42 and register an input. Haptic actuators 46 are disposed below fixed keys 24 to provide a haptic response as feedback to the end user when an input force is detected at a fixed key 24. For example, a haptic actuator is located under each fixed key 24 to provide distinct haptic feedback for each fixed key input that is sensed. Wirelines integrated in membrane 42 communicate between a force sensor under each fixed key 24 and pressure sensor controller 28. Wirelines integrated in membrane 42 communicate between contact sensors under each moveable key 26 and contact sensor 30. In addition, a microLED 62 or other light source, such as an organic light emitting diode (OLED) material may integrate in membrane 42 to provide a backlight for viewing the keys in a low light situation.

Although the example embodiment depicts one contiguous membrane having raised and lowered portions, alternative embodiments may use separate membranes or flexible circuits for the different types of sensors. In addition, the example embodiment includes haptic actuators that couple as separate elements to membrane 42. In an alternative embodiment, haptic actuators, such as piezoelectric actuators, may integrate with membrane 42. The amount of vertical travel of moveable keys 26 may vary in different embodiments as needed to meet Z-height constraints of the main housing portion.

Figure 4A:
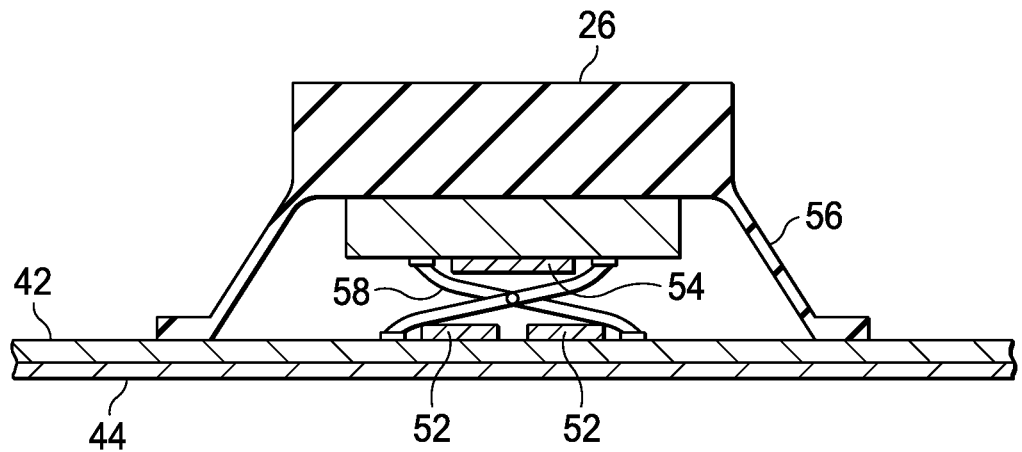
FIGS. 4A and 4B depict examples of moveable and fixed keyboard keys.
Figure 4B:
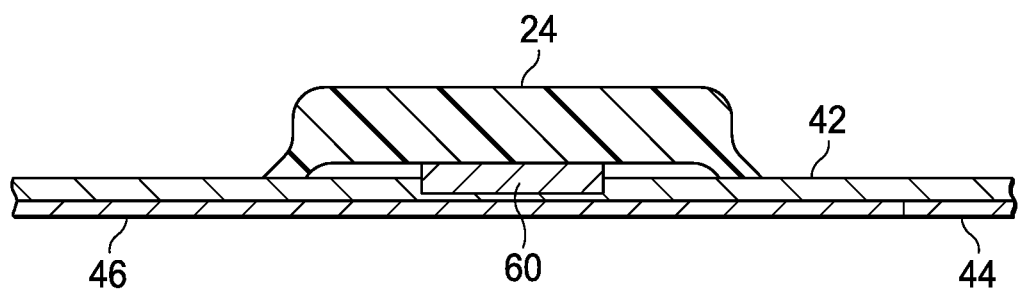

Referring now to FIGS. 4A and 4B, examples of moveable and fixed keyboard keys are depicted. FIG. 4A depicts a moveable key 26 that travels vertically from the raised position that is depicted to a depressed position in order to record an input at membrane 42. In the example embodiment, membrane contacts 52 provide an incomplete circuit that is closed by key contact 54 when moveable key 26 depresses in response to an end user press. A rubber dome 56 or other biasing device works against the end user press to return moveable key 26 to a raised position after the end user input. A scissor 58 or other guiding structure maintains alignment of moveable key 26 during movement between the raised and depressed positions. Support plate 44 provides resistance against the end user press so that contacts 52 and 54 complete the input circuit in a predictable manner and provides an end user with feedback of a completed contact that supports more rapid typing. The raised position depicted by FIG. 4A aligns moveable key 26 at its upper surface with the upper surface of fixed keys 24. Although the example embodiment depicts a rubber-dome and scissors type of input key, other embodiments may detect key proximity to membrane 42 with other types of sensors, such as magnetic and light sensors, and may bias the key upwards with other types of biasing devices, such as springs or opposing magnet pole orientation.

FIG. 4B depicts an example of a fixed key 24 disposed over a support plate 44, a haptic actuator 46 and membrane 42. A pressure sensor 60 integrates in membrane 42 to detect an input when fixed key 42 presses down with a force. In an alternative embodiment, pressure sensor 42 may be a capacitive sensor or other type of sensor that detects a touch force. Although membrane 42 may compress slightly in response to the force of an input, the input is sensed without requiring any movement, and the amount of movement is minimal so that fixed key 24 remains substantially at the same vertical plane during an input as during no input. In the example embodiment, both support plate 44 and haptic actuator 46 support fixed key 24 at a substantially fixed vertical alignment. In an alternative embodiment, haptic actuator 46 may provide support for fixed key 24 without additional support provided by support plate 44. In particular, haptic actuator 46 may provide support in a raised relative positon to the plane at which support plate 44 provides support at the lower region of membrane 42. A raised relative vertical plane for support of fixed key 24 provides additional room below fixed key 24 compared with moveable key 26 so that additional room is available under fixed key 24 for information handling system components, such as a port disposed at the side of the information handling system housing.

Although the present invention has been described in detail, it should be understood that various changes, substitutions and alterations can be made hereto without departing from the spirit and scope of the invention as defined by the appended claims.

What is claimed is:
1. An information handling system comprising:
   a housing having first and second housing portions rotationally coupled by a hinge to rotate between open and closed positions;
   a processor disposed in the housing and operable to execute instructions that process information;

a memory disposed in the housing and interfaced with the processor, the memory operable to store the instructions and information;

a display integrated in the first housing portion and interfaced with the processor, the display operable to present the information as visual images; and a keyboard integrated in the second housing portion, the keyboard having a first set of keys configured to depress with vertical movement from a first vertical position to make inputs by contact of the first set of keys against a membrane disposed under the first set of keys at a second vertical position and a second set of plural keys configured to sense an input by a touch applied to any one of the second set of plural keys without vertical movement of the second set of plural keys, the second set of plural keys at the first vertical position;

wherein the membrane extends under both the first and second set of keys, the membrane having a contact sensor under each key of the first set of keys to detect an input by depression and vertical movement against the membrane and a pressure sensor under each key of the second set of plural keys to detect an input by a force applied against the membrane without vertical movement of the key.

2. The information handling system of claim 1 further comprising:
a haptic actuator disposed under the second set of plural keys; and
a controller operable to command actuation of the haptic actuator in response to an input detected at the second set of plural keys.

3. The information handling system of claim 1 wherein the first set of keys are disposed in a central portion of the keyboard and the second set of plural keys are disposed at opposing ends of the keyboard.

4. The information handling system of claim 3 wherein the opposing ends of the keyboard align with a perimeter of the housing.

5. The information handling system of claim 1 wherein the membrane has a first height under the first set of keys and a second height under the second set of plural keys, the second thickness greater than the first thickness.

6. The information handling system of claim 4 further comprising a haptic actuator disposed under each key of the second set of plural keys.

7. The information handling system of claim 6 further comprising:
a contact switch controller interfaced with the membrane at the first set of keys to detect key contacts at the membrane; and
a pressure sensor controller interfaced with the membrane at the second set of plural keys to detect pressure inputs at the pressure sensor.

8. The information handling system of claim 7 wherein the pressure sensor controller further interfaces with each haptic actuator and operable to actuate each haptic actuator based upon a detected pressure input at an associated pressure sensor.

9. A method for detecting key inputs, the method comprising:
detecting a first key input at depression of the first key to close a contact integrated in a membrane, the first key biased up to a first vertical position and depressing to a second vertical position to close the contact; and
detecting a second key input as a force applied against the second key, the force translated to a pressure sensor integrated in the membrane, the second key fixed at the first vertical position to detect an input without vertical movement of the second key;

wherein the membrane detects both inputs with key depression and vertical movement and inputs with a force and without key depression and vertical movement.

10. The method of claim 9 further comprising:
depressing the first key from a first height to a second height, the key closing the contact at the second height; and
detecting the second key input at the first height.

11. The method of claim 10 further comprising:
disposing only keys that detect pressure at the first height at each of opposing sides of keyboard; and
integrating the keyboard in an information handling system housing to have the opposing sides of the keyboard aligned with the housing perimeter.

12. The method of claim 11 further comprising:
detecting the first key input at a first controller interfaced with the contact; and
detecting the second key input with a second controller interfaced with the pressure sensor.

13. The method of claim 10 further comprising:
disposing a haptic actuator under the second key and interfaced with the second controller; and
in response to the detecting the second key input, actuating the haptic actuator.

14. The method of claim 9 further comprising:
supporting the membrane on a support plate;
wherein:
the membrane has a lower portion under the first key so that the first key travels from a first height raised above the membrane to a second height in contact with the membrane; and
the membrane has a raised portion under the second key so the second key translates force to the pressure sensor at the first height.

15. The method of claim 14 wherein the membrane comprises a contiguous polyethylene terephthalate film.

16. A keyboard comprising:
a membrane configured to detect both a key press to vertically depress the key and contact the membrane and a key press to apply a predetermined force against the membrane without vertical key movement;
a first set of keys biased up over the membrane to depress from a first height to a second height, the membrane detecting an input by each key of the first set of keys based upon a press to the second height; and
a second set of plural keys disposed over the membrane at the first height, the membrane detecting an input by each key of the second set of plural keys based upon a press at the first height.

17. The keyboard of claim 16 wherein the second set of keys are disposed at opposing ends of the keyboard and the first set of keys are disposed between the second set of keys.

18. The keyboard of claim 17 further comprising:
a contact sensor integrated in the membrane below each key of the first set of keys; and
a pressure sensor integrated in the membrane below each key of the second set of keys.

19. The keyboard of claim 18 further comprising:
a haptic actuator disposed below each key of the second set of keys; and a controller interfaced with each pressure sensor and each haptic actuator, the controller actuating each haptic actuator at detection of an input at the key associated with the haptic actuator.

* * * * *